(12) United States Patent
Arimilli et al.

(10) Patent No.: US 6,324,617 B1
(45) Date of Patent: Nov. 27, 2001

(54) METHOD AND SYSTEM FOR COMMUNICATING TAGS OF DATA ACCESS TARGET AND CASTOUT VICTIM IN A SINGLE DATA TRANSFER

(75) Inventors: Ravi Kumar Arimilli, Austin; John Steven Dodson, Pflugerville; Guy Lynn Guthrie; Jody B. Joyner, both of Austin; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,222

(22) Filed: Aug. 4, 1999

(51) Int. Cl.$^7$ ....................................... G06F 12/00
(52) U.S. Cl. ..................................... 711/1; 711/3; 711/154
(58) Field of Search ..................... 711/119, 122, 711/141, 143, 1, 3, 154

(56) References Cited

U.S. PATENT DOCUMENTS

| | | |
|---|---|---|
| 4,797,814 | 1/1989 | Brenza . |
| 5,369,753 | 11/1994 | Tipley . |
| 5,493,668 | 2/1996 | Elko et al. . |
| 5,564,035 | 10/1996 | Lai . |
| 5,636,355 | 6/1997 | Ramarkrishnan et al. . |
| 5,829,040 | 10/1998 | Son . |
| 5,895,495 | 4/1999 | Arimilli et al. . |
| 5,946,709 | 8/1999 | Arimilli et al. . |
| 5,966,729 | 10/1999 | Phelps . |
| 6,018,791 | 1/2000 | Arimilli et al. . |
| 6,021,468 | 2/2000 | Arimilli et al. . |
| 6,023,747 | 2/2000 | Dodson . |
| 6,029,204 | 2/2000 | Arimilli et al. . |
| 6,058,456 | 5/2000 | Arimilli et al. . |
| 6,195,729 | 2/2001 | Arimilli et al. . |

OTHER PUBLICATIONS

Handy, Jim; The Cache Memory Book; Academic Press, Inc.; 1993; figure 2.22(a) (i.e., pp. 78–79).*
Texas Instruments Incoporated, TMS32010 User's Guide, 1983, p. 3.7.
Lebeck, A. R., Sohi, G. S.; Request Combining in Multi-processors with Arbitrary Interconnection Networks, IEEE Digital Library, vol. 5, Issue 11, Nov. 1994, Abstract Only.

* cited by examiner

*Primary Examiner*—David L. Robertson
(74) *Attorney, Agent, or Firm*—Casimer K. Salys; Bracewell & Patterson, L.L.P.

(57) ABSTRACT

A combined address bus transaction contains the address tag for a data access operation target, the address tag for a victim to be replaced, and the address index field identifying the congruence class including both the target and the victim. Directory state information such as coherency state and/or LRU position for the cast out victim may also be appended to the index field and target and victim address tags within the bus operation. Address bus bandwidth utilization is thereby improved, eliminating duplicate transmission of the index field employed by separate data access and cast out operations in accordance with the existing practice. The victim may be prospectively selected concurrently with the determination of whether the target may be found within the storage device forming the combined address, improving overall performance for that device.

29 Claims, 5 Drawing Sheets

METHOD AND SYSTEM FOR COMMUNICATING TAGS OF DATA ACCESS TARGET AND CASTOUT VICTIM IN A SINGLE DATA TRANSFER

RELATED APPLICATIONS

The present invention is related to the subject matter of commonly assigned, copending U.S. patent applications: Ser. No. 09/368,221 entitled "SYSTEM BUS DIRECTORY SNOOPING MECHANISM FOR READ/CASTOUT (RCO) ADDRESS TRANSACTION"; Ser. No. 09/368,225 entitled "PRECISE INCLUSIVITY MECHANISM FOR SYSTEM BUS WITH READ/DEALLOCATE (RDA) ADDRESS TRANSACTION"; Ser. No. 09/368,224 entitled "MULTIPROCESSOR SYSTEM BUS WITH CACHE STATE AND LRU SNOOP RESPONSES FOR READ/CASTOUT (RCO) ADDRESS TRANSACTION"; Ser. No. 09/368,223 entitled "UPGRADING OF SNOOPER CACHE STATE MECHANISM FOR SYSTEM BUS WITH READ/CASTOUT (RCO) ADDRESS TRANSACTIONS"; Ser. No. 09/368,227 entitled "MULTIPROCESSOR SYSTEM BUS WITH COMBINED SNOOP RESPONSES IMPLICITLY UPDATING SNOOPER LRU POSITION"; Ser. No. 09/368,226 entitled "MULTIPROCESSOR SYSTEM BUS WITH SYSTEM CONTROLLER EXPLICITLY UPDATING SNOOPER CACHE STATE INFORMATION"; Ser. No. 09/368,229 entitled "MULTIPROCESSOR SYSTEM BUS WITH SYSTEM CONTROLLER EXPLICITLY UPDATING SNOOPER LRU INFORMATION"; Ser. No. 09/368,228 entitled "MULTIPROCESSOR SYSTEM BUS WITH COMBINED SNOOP RESPONSES EXPLICITLY CANCELLING MASTER VICTIM SYSTEM BUS TRANSACTION"; Ser. No. 09/368,230 entitled "MULTIPROCESSOR SYSTEM BUS WITH COMBINED SNOOP RESPONSES EXPLICITLY CANCELLING MASTER ALLOCATION OF READ DATA"; and Ser. No. 09/368,231 entitled "MULTIPROCESSOR SYSTEM BUS WITH COMBINED SNOOP RESPONSES EXPLICITLY INFORMING SNOOPERS TO SCARF DATA". The content of the above-identified applications are incorporated herein by reference.

BACKGROUND OF THE INVENTION

1. Technical Field

The present invention generally relates to address transmission for data access operations in data processing systems and in particular to address transmission for related data access and cast out operations. Still more particularly, the present invention relates to a combined address transmission for related data access and cast out operations to improve address bus bandwidth utilization and cache performance.

2. Description of the Related Art

High performance data processing systems typically include a number of levels of caching between the processor (s) and system memory to improve performance, reducing latency in data access operations. When utilized, multiple cache levels are typically employed in progressively larger sizes with a trade off to progressively longer access latencies. Smaller, faster caches are employed at levels within the storage hierarchy closer to the processor or processors, while larger, slower caches are employed at levels closer to system memory. Smaller amounts of data are maintained in upper cache levels, but may be accessed faster.

Within such systems, when data access operations frequently give rise to a need to make space for the subject data. For example, when retrieving data from lower storage levels such as system memory or lower level caches, a cache may need to overwrite other data already within the cache because no further unused space is available for the retrieved data. A replacement policy—typically a least-recently-used (LRU) replacement policy—is employed to decide which cache location(s) should be utilized to store the new data.

Often the cache location (commonly referred to as a "victim") to be overwritten contains only data which is invalid or otherwise unusable from the perspective of a memory coherency model being employed, or for which valid copies are concurrently stored in other devices within the system storage hierarchy. In such cases, the new data may be simply written to the cache location without regard to preserving the existing data at that location.

At other times, however, the cache location selected to received the new data contains modified data, or data which is otherwise unique or special within the storage hierarchy. In such instances, the replacement of data within a selected cache location (a process often referred to as "updating" the cache) requires that any modified data associated with the cache location selected by the replacement policy be written back to lower levels of the storage hierarchy for preservation. The process of writing modified data from a victim to system memory or a lower cache level is generally called a cast out or eviction.

When a cache initiates a data access operation—for instance, in response to a cache miss for a READ operation originating with a processor—typically the cache will initiate a data access operation (READ or WRITE) on a bus coupling the cache to lower storage levels. If the replacement policy requires that a modified cache line be overwritten, compelling a cast out for coherency purposes, the cache will also initiate the cast out, but on a subsequent bus cycle. The data access operation thus requires multiple operations, and bus cycles, to complete.

It would be desirable, therefore, to reduce the latency associated with data access operations requiring a victim cast out. It would further be advantageous to improve address bus bandwidth utilization for data access operations requiring a cast out.

SUMMARY OF THE INVENTION

It is therefore one object of the present invention to provide improved address transmission for data access operations in data processing systems.

It is another object of the present invention to provide improved address transmission for related data access and cast out operations in data processing systems.

It is yet another object of the present invention to provide a combined address transmission for related data access and cast out operations to improve address bus bandwidth utilization and cache performance.

The foregoing objects are achieved as is now described. A combined address bus transaction contains the address tag for a data access operation target, the address tag for a victim to be replaced, and the address index field identifying the congruence class including both the target and the victim. Directory state information such as coherency state and/or LRU position for the cast out victim may also be appended to the index field and target and victim address tags within the bus operation. Address bus bandwidth utilization is thereby improved, eliminating duplicate transmission of the index field employed by separate data access and cast out operations in accordance with the existing practice. The victim may be prospectively selected concurrently with the determination of whether the target may be found within the storage device forming the combined address, improving overall performance for that device.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
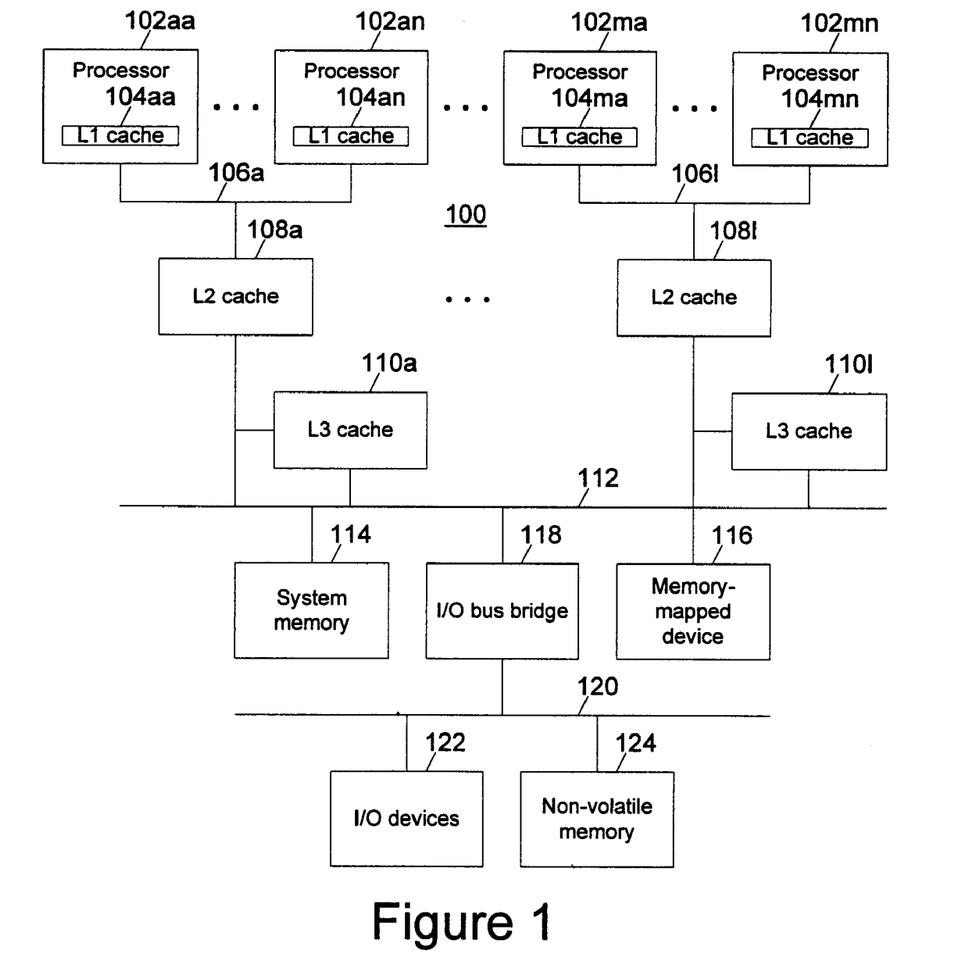
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 is a symmetric MULTIPROCESSOR (SMP) system including a plurality of processors 102aa through 102an and 102ma through 102mn (where "m" and "n" are integers). Each processor 102aa–102mn includes a respective level one (L1) cache 104aa–104mn, preferably on chip with the processor and bifurcated into separate instruction and data caches. Each processor 102aa–102mn is coupled via a processor bus 106aa–106l to a level two cache 108a–108l (where "l" is an integer), which are in-line caches shared by multiple processors in the exemplary embodiment.

Although in the exemplary embodiment only two processors are depicted as sharing each L2 cache, and only two L2 caches are depicted, those skilled in the art will appreciate that additional processors L2 caches may be utilized in a multiprocessor data processing system in accordance with the present invention. For example, each L2 cache may be shared by four processors, and a total of sixteen L2 caches may be provided.

Each L2 cache 108a–108l is connected to a level three (L3) cache 110a–110l and to system bus 112. L3 caches 110a–110l are actually in-line caches rather than lookaside caches as FIG. 1 suggests, but operations received from a vertical L2 cache (e.g., L2 cache 108a) are initiated both within the L3 cache 110a and on system bus 112 concurrently to reduce latency. If the operation produces a cache hit within the L3 cache 110a, the operation is cancelled or aborted on system bus 112. On the other hand, if the operation produces a cache miss within the L3 cache 110a, the operation is allowed to proceed on system bus 112.

The lower cache levels—L2 caches 108a–108l and L3 caches 110a–110l—are employed to stage data to the L1 caches 104a–104l and typically have progressively larger storage capacities but longer access latencies. L2 caches 108a–108l and L3 caches 110a–110l thus serve as intermediate storage between processors 102a–102l and system memory 114, which typically has a much larger storage capacity but may have an access latency many times that of L3 caches 110a–110l. Both the number of levels in the cache hierarchy and the cache hierarchy configuration (i.e, shared versus private, in-line versus lookaside) employed in data processing system 100 may vary.

L2 caches 108a–108l and L3 caches 110a–110l are connected to system memory 114 via system bus 112. Also connected to system bus 112 may be a memory mapped device 116, such as a graphics adapter providing a connection for a display (not shown), and input/output (I/O) bus bridge 118. I/O bus bridge 118 couples system bus 112 to I/O bus 120, which may provide connections for I/O devices 122, such as a keyboard and mouse, and nonvolatile storage 124, such as a hard disk drive. System bus 112, I/O bus bridge 118, and I/O bus 120 thus form an interconnect coupling the attached devices, for which alternative implementations are known in the art.

Non-volatile storage 124 stores an operating system and other software controlling operation of system 100, which are loaded into system memory 114 in response to system 100 being powered on. Those skilled in the art will recognize that data processing system 100 may include many additional components not shown in FIG. 1, such as serial and parallel ports, connections to networks or attached devices, a memory controller regulating access to system memory 114, etc. Such modifications and variations are within the spirit and scope of the present invention.

Figure 2A:
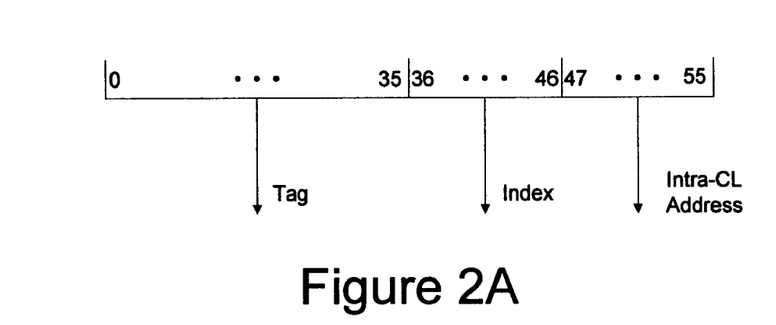
FIGS. 2A–2B are an addressing scheme and a combined address for related data access and cast out operations for transmission in accordance with a preferred embodiment of the present invention.
Figure 2B:
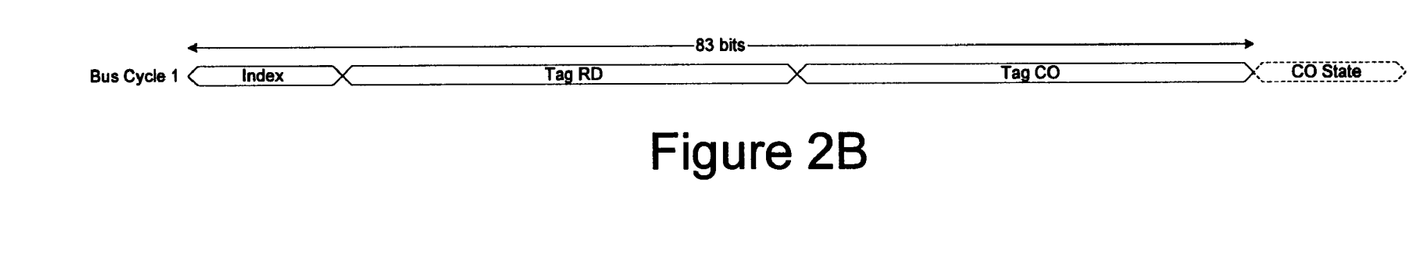

Referring to FIGS. 2A and 2B, an addressing scheme and a combined address for related data access and cast out operations for transmission in accordance with a preferred embodiment of the present invention are illustrated. In the exemplary embodiment, the combined address is transmitted on system bus 112 by an L2 cache 108a–108l in response to a cache miss for a data access operation within the L2 cache. However, the combined address may be employed for transmission on any bus by any storage device initiating related data access and cast out operations. Similarly, the data access operation is a READ in the exemplary embodiment, but may be any data access operation (e.g., WRITE, etc.).

When a cache miss occurs within the L2 cache for a data access operation, the cache controller for the L2 cache should be able to determine whether a cast out will be required to preserve data within the cache location selected to be updated by the replacement policy. Moreover, an indexed cache organization is employed for caches within the preferred embodiment. Cache lines are stored within the cache in congruence classes, sets of cache lines identified by a common index field within the system addresses for the cache lines in a congruence class.

An exemplary addressing scheme for data processing system 100 is shown in FIG. 2A. In the example shown, bits 0 . . . 35 of a 56 bit cache line address are the tag, bits 36 . . . 46 are the index, and the remaining bits are an intra-cache line address. The index field of the address is employed by the cache directory and the cache memory to locate congruence classes. Cache directory stores tags for cache lines contained within cache memory within the congruence class identified by the index, and compares the tag of a target address to the tags within the congruence class. If a match is identified, the corresponding cache line within cache memory is the target data.

In the prior art, the address for a data access operation and the address for a related cast out are transmitted in separate system bus operations. However, within an indexed cache organization of the type described, the target data of a data access operation and the victim selected by the replacement policy are members of the same congruence class. Therefore the index field will be identical for both the data access and the cast out. In the present invention, the index for the congruence class containing the target cache lines for both the data access and the cast out ("Index") is combined with the tags for the cache line targeted by the data access ("Tag RD") and the cache line targeted by the cast out ("Tag CO"). The directory state ("CO State") of the cast out victim cache line—i.e., coherency state and/or LRU state—may also be appended to the address.

The combined address of the present invention may be employed whenever the need to preserve some unique aspect of data arises. Under the basic MESI coherency protocol, which includes the modified (M), exclusive (E), shared (S), and invalid (I) coherency states, a modified cache segment should be written to lower level storage when selected to be replaced. The modified state indicates that cache data has been modified with respect to corresponding data in system memory without also modifying the system memory data, such that the only valid copy of the data is within the cache entry storing the modified cache line or segment.

For exclusive, shared, or invalid cache segments, the cache segemented selected for replacement need not be written to lower level storage since either (1) a valid copy already exists elsewhere in storage, or (2) the contents of the cache segment are invalid. The exclusive state indicates that the cache entry is consistent with system memory but is only found, within all caches at that level of the storage hierarchy, in the subject cache. The shared state indicates that the cache entry may be found in the subject cache and at least one other cache at the same level in the storage hierarchy, with all copies of the data being consistent with the corresponding data in system memory. Finally, the invalid state indicates that a cache entry—both the data and the address tag—within a given cache entry is no longer coherent with either system memory or other caches in the storage hierarchy.

Coherency states implemented as extensions to the basic MESI protocol may also require a cast out, or elect to perform a cast out, and therefore benefit from the present invention. For example, the recent (R) state, essentially a variant of the shared state, indicates that the cache entry may be found in both the subject cache and at least one other cache at the same level in the storage hierarchy, and that all copies of the data in the subject cache and other caches are consistent with the corresponding data in system memory, but also indicates that the subject cache, of all caches containing the shared data, most recently received the data in a system bus transaction such as a read from system memory. While a cast out is not necessary to preserve data integrity in such a case, a cast out operation may be useful to accurately maintain the recent state, and the combined address bus transaction of the present invention may be utilized for that purpose.

The combined address of the present invention will save bus cycles over the dual operation scheme of the known art. If each index or tag requires a full bus cycle to completely transmit, the combined address of the present invention may be transmitted in three bus cycles (neglecting the optional state information), rather than four bus cycles as would be required for separate data access and cast out operations. The additional bus cycle is saved because the index field need only be transmitted once for both operations.

The resulting system bus transaction condenses, within a single address, the information required for both the data access operation and the related cast out. The combined index and tags may be transmitted in any predefined order, and may be transmitted on a single bus cycle as shown in FIG. 2B or over multiple consecutive bus cycles. If the combined address is transmitted over multiple bus cycles, the index should be transmitted first to allow the receiving devices to begin a directory lookup at the earliest possible time. The tags may be transmitted during subsequent cycles and still be timely for the comparators employed to compared directory tags to the target tag(s). See commonly assigned, copending U.S. patent application Ser. No. 09/345, 302 entitled "INDEX BASED SYSTEM ADDRESS BUS," incorporated herein by reference.

Figure 3A:
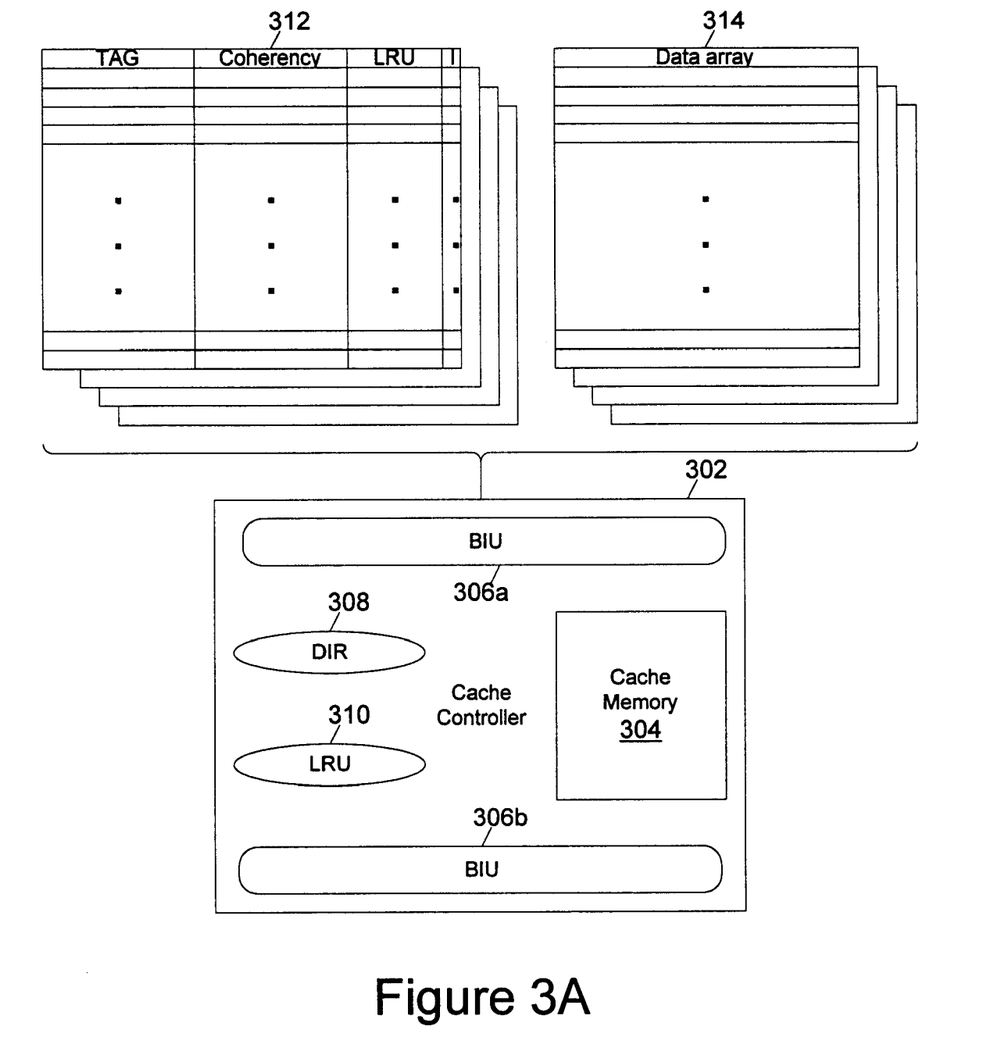
FIGS. 3A–3B depict diagrams of a cache and related cache control logic for formulating and transmitting the combined address for related data access and cast out operations in accordance with a preferred embodiment of the present invention.
Figure 3B:
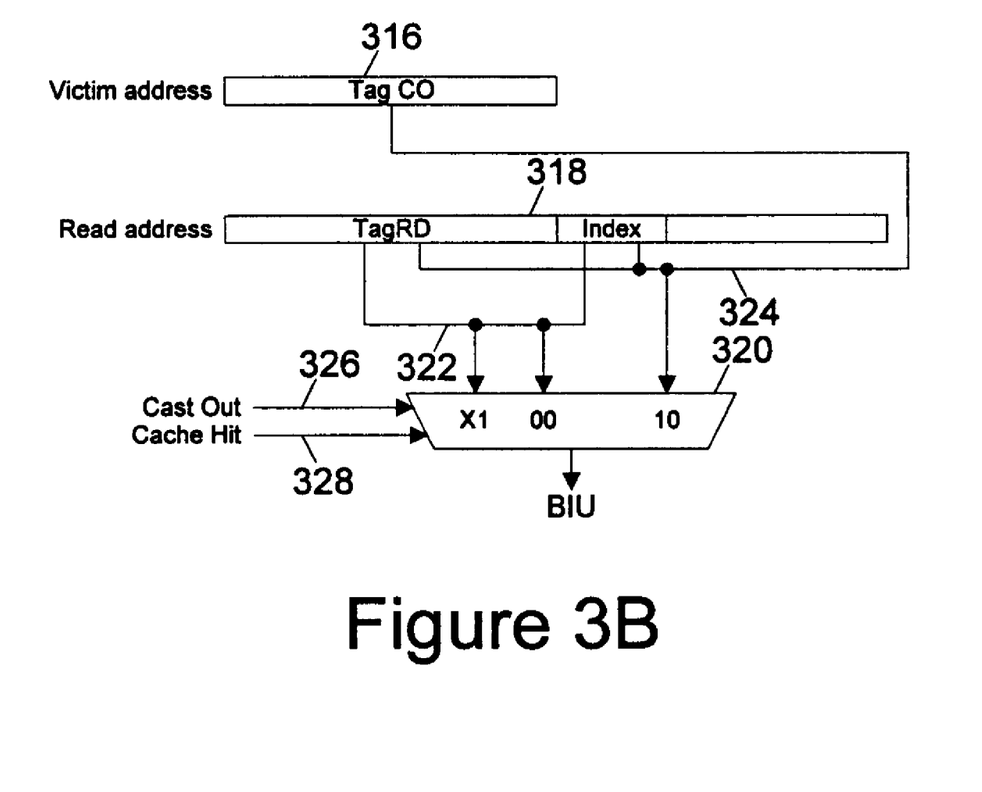

With reference now to FIGS. 3A through 3B, diagrams of a cache and related cache control logic for formulating and transmitting the combined address for related data access and cast out operations in accordance with a preferred embodiment of the present invention is depicted. The elements depicted are employed in L2 caches 108*a*–108n and in L3 caches 110*a*–110*n*. A cache controller 302 receives and transmits operations relating to data within cache memory 304 from upstream and downstream buses through bus interface units ("BIU") 306*a* and 306*b*. A directory lookup 308 is employed to locate cache lines within cache memory 304 and an LRU unit 310 implements the replacement policy for updating cache lines within cache memory 304.

The logical organization of data within the cache is in tables containing cache directory entries 312 and a corresponding data array 314. The cache directory entries 312 contain the address tag for the corresponding cache lines within data array 314, as well as the coherency state, the LRU status, and an inclusivity ("I") state for the respective cache line. The coherency state indicates the consistency of the cache line with other copies of the cache line in other storage devices within the system. The LRU status indicates the LRU position for the cache line within a congruence class. The inclusivity state indicates whether the cache line is stored within a logically in-line, higher level cache.

When a data access operation is received from a processor or higher level storage device, cache controller 302 may trigger the LRU 310 to select a victim, then look up the selected victim to determine if a cast out would be required to update the corresponding cache line and, if so, retrieve the tag for the current contents of the potential victim. This may be performed concurrently with the directory lookup and tag comparison employed to determine whether the received data access operation generates a cache hit or miss.

FIG. 3B depicts a detail of the portion of a cache employed to formulate and transmit a combined address for related data access and cast out operations. When a data access operation is received, the identity and address tag 316 for the potential victim are determined from the replacement policy (LRU) and cache directory. The index field and address tag 318 for the data access operation are supplied within the operation.

A multiplexer 320 receives, as one input 322, the index field and address tag 318 for the data access operation. As the other input 324, multiplexer 320 receives the index field and address tag 318 combined with the address tag 316 for the potential cast out. Multiplexer 320 is controlled by a cast out signal 326 indicating whether a cast out may be required for the data access operation. This may be determined by examining the coherency state of the potential victim and whether the current access was a miss. If the potential victim does not contain valid and unique data (e.g., the coherency state is "shared" or "invalid"), the cast out signal 326 is not asserted. If the potential victim contains unique and valid data (e.g., the coherency state is "modified"), case out signal 326 is asserted.

Multiplexer 320 is also controlled by a cache hit signal 328, taken from the end of the directory lookup and tag comparison functions within the cache and asserted if the cache contains the target data for the received data access operation. If cache hit signal 328 is asserted, the first input 322 is passed to the bus interface unit regardless of whether the cast out signal 326 was asserted. If a cache hit occurs, the target data is within the cache and no need to select a victim exists. Furthermore, no need exists to transmit the address for the data access operation to lower level storage devices, except perhaps to allow the lower level storage devices to update their coherency state and/or LRU information relating to the target cache line.

If neither the cast out signal 326 nor the cache hit signal 328 are asserted, the first input 322 is similarly passed to the bus interface unit. In this circumstance, no need to perform a cast out exists (e.g., the victim was "invalid"). The address for the data access operation will be transmitted to the lower storage levels, however, and the cast out tag may optionally be transmitted with the index and tag for the data access operation to allow lower level devices to update status information (e.g., "recent" version of shared coherency state or LRU position). Otherwise, the second input 324 is passed to the bus interface unit only when the cache hit signal 328 is not asserted (i.e., cache miss) and the cast out signal 326 is asserted. In this case, both the address tag for the data access and the cast out tag will be transmitted with multiplexer 320 to allow a lower level cache a chance to process both operations.

Figure 4:
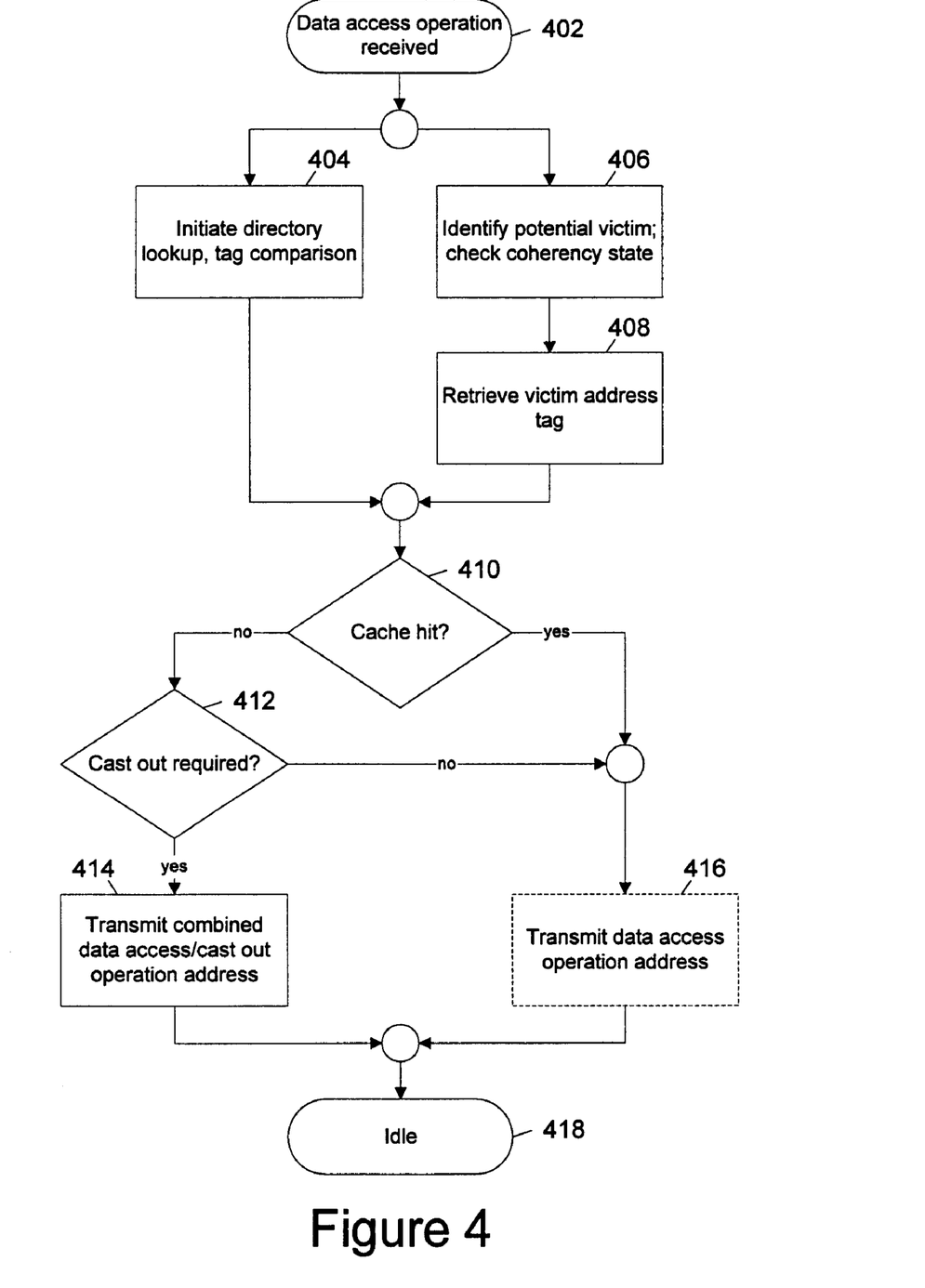
FIG. 4 is a high level flow chart for a process of formulating and transmitting the combined address for related data access and cast out operations in accordance with a preferred embodiment of the present invention.

Referring to FIG. 4, a high level flow chart for a process of formulating and transmitting the combined address for related data access and cast out operations in accordance with a preferred embodiment of the present invention is illustrated. The process begins at step 402, which depicts receiving a data access operation from a higher storage level device. The process then passes to step 404, which illustrates initiating a directory lookup and tag comparison with the address received for the data access operation.

The process also passes to step 406, which depicts identifying a potential victim within the congruence class for the target of the received data access operation based on LRU status, and checking the coherency state for the potential victim. The process then passes to step 408, which illustrates retrieving the address tag for the potential victim.

Steps 406 through 408 may be performed concurrently with step 404. From either of steps 404 or 408, the process passes to step 410, which depicts a determination of whether a cache hit occurred on the received data access operation. If not, the process proceeds to step 412, which illustrates a determination of whether a cast out is required for the potential victim (i.e., the potential victim's coherency state indicates that it contains valid and unique data). If so, the process proceeds to step 414, which depicts transmitting a combined data access and cast out address including the index and both tags to the lower level storage hierarchy.

If a cache hit occurred (step 410) or if no cast out is required for the data access (step 412), the process proceeds instead to step 416, which illustrates transmitting the address for the data access operation to lower storage levels if necessary (e.g., to update coherency state in lower storage levels). Step 416 is optional when there is a cache hit (e.g., transition from step 410 to step 416). From either of steps 414 or 416, the process then passes to step 418, which depicts the process becoming idle until another data access operation is received.

The present invention improves address bus bandwidth utilization by condensing address information for related data access and cast out operations, eliminating duplication of index transmission. Performance of the storage device transmitting the combined address may also be improved, since the cast out victim may be selected and the combined address may be formulated for transmission before a determination of the need for a cast out is complete.

While the invention has been particularly shown and described with reference to a preferred embodiment, it will be understood by those skilled in the art that various changes in form and detail may be made therein without departing from the spirit and scope of the invention.

What is claimed is:

1. A method of transmitting an address, comprising:
   receiving a data access operation which misses;
   selecting a victim; and
   transmitting a target tag for a target of the data access operation and a victim tag for the victim in a single bus transfer.

2. The method of claim 1, further comprising:
   determining whether a target for the data access operation is contained within a storage device receiving the data access operation.

3. The method of claim 2, wherein the step of selecting a victim is performed concurrently with the step of determining whether a target for the data access operation is contained within a storage device receiving the data access operation.

4. The method of claim 1, wherein the step of transmitting a target tag for a target of the data access operation and a victim tag for the victim in a single bus transfer further comprises:
   transmitting the target tag and the victim tag on consecutive bus cycles.

5. The method of claim 1, wherein the step of transmitting a target tag for a target of the data access operation and a victim tag for the victim in a single bus transfer further comprises:
   transmitting an index for the data access operation in the single bus transfer.

6. The method of claim 5, wherein the step of transmitting an index for the data access operation in the single bus transfer further comprises:
   transmitting the index before the target tag and the victim tag.

7. The method of claim 1, wherein transmitting is performed prior to receiving data associated with said target tag in response to said data access operation.

8. A method of combining data access and cast out operations, comprising:
   forming a combined address including:
      a first address tag for a first storage element requested by a data access operation; and
      a second address tag for a second storage element, different than the first storage element, in which data requested by the data access operation will be stored; and transmitting the combined address in a single bus transfer.

9. The method of claim 8, wherein the step of forming a combined address including a first address tag for a first storage element requested by a data access operation and a second address tag for a second storage element in which data requested by the data access operation will be stored further comprises:

forming the combined address with an index identifying a congruence class including the first and second address tags.

10. The method of claim 8, wherein the step of forming a combined address including a first address tag for a first storage element requested by a data access operation and a second address tag for a second storage element in which data requested by the data access operation will be stored further comprises:

forming the combined address with directory state information for the second storage element appended to the first and second address tags.

11. The method of claim 8, wherein the step of forming a combined address including a first address tag for a first storage element requested by a data access operation and a second address tag for a second storage element in which data requested by the data access operation will be stored further comprises:

utilizing a replacement policy, selecting a victim comprising the second storage element.

12. The method of claim 8, wherein transmitting is performed prior to receiving data associated with said target tag in response to said data access operation.

13. A system for transmitting an address, comprising:

a cache receiving a data access operation which misses and selecting a victim; and a bus coupling the cache to at least one other cache, wherein the cache transmits a target tag for a target of the data access operation and a victim tag for the victim in a single transfer on the bus.

14. The system of claim 13, wherein the cache determines whether a target for the data access operation is contained within the cache.

15. The system of claim 14, wherein the cache selects a victim concurrently with determining whether the target for the data access operation is contained within the cache.

16. The system of claim 13, wherein the cache transmits the target tag and the victim tag on consecutive bus cycles.

17. The system of claim 13, wherein the cache transmits an index for the data access operation in the single bus transfer.

18. The system of claim 17, wherein the cache transmits the index before the target tag and the victim tag.

19. The system of claim 13, wherein the cache transmits the single bus transfer prior to receiving data associated with said target tag in response to said data access operation.

20. A system for combining data access and cast out operations, comprising:

a storage device forming a combined address including:

a first address tag for a first storage element requested by a data access operation; and a second address tag for a second storage element, different than the first storage element, in which data requested by the data access operation will be stored; and a bus coupled to the storage device, wherein the storage device transmits the combined address in a single transfer on the bus.

21. The system of claim 20, wherein the storage device forms the combined address with an index identifying a congruence class including the first and second address tags.

22. The system of claim 20, wherein the storage device forms the combined address with directory state information for the second storage element appended to the first and second address tags.

23. The system of claim 20, wherein the storage device, utilizing a replacement policy, selects a victim comprising the second storage element.

24. The system of claim 20, wherein the storage device is a processor with an internal cache.

25. The system of claim 20, wherein the storage device is a cache.

26. The system of claim 20, wherein the bus is a processor bus.

27. The system of claim 20, wherein the bus is a system bus.

28. The system of claim 20, further comprising:

a plurality of processor coupled to the storage device;

a plurality of storage devices including the storage device coupled to the bus; and a system memory coupled to the bus.

29. The system of claim 20, wherein the storage device transmits the single bus transfer prior to receiving data associated with said target tag in response to said data access operation.

* * * * *